United States Patent [19]

Bonsall, III

[11] Patent Number: 6,054,186

[45] Date of Patent: Apr. 25, 2000

[54] LOW CEMENT REFRACTORY CASTABLE SYSTEM FOR WET PROCESS PUMPING/SPRAYING

[75] Inventor: Samuel B. Bonsall, III, State College, Pa.

[73] Assignee: North American Refractories Co., Cleveland, Ohio

[21] Appl. No.: 08/864,658

[22] Filed: May 28, 1997

[51] Int. Cl.⁷ ........................................................ B05D 1/02
[52] U.S. Cl. .......................................... 427/427; 427/421
[58] Field of Search ...................................... 427/421, 427

[56] References Cited

U.S. PATENT DOCUMENTS

| | | | |
|---|---|---|---|
| 3,653,951 | 4/1972 | Maldeis et al. | 117/104 R |
| 4,046,584 | 9/1977 | Snyder et al. | 106/90 |
| 4,272,020 | 6/1981 | Allison | 239/8 |
| 4,385,749 | 5/1983 | van der Linden | 266/45 |
| 4,461,789 | 7/1984 | Takashima | 427/426 |
| 4,623,393 | 11/1986 | Toda et al. | 106/38.22 |
| 4,638,945 | 1/1987 | Toda et al. | 239/143 |
| 4,779,798 | 10/1988 | Natolino et al. | 239/227 |
| 4,901,985 | 2/1990 | Soofi | 266/281 |
| 4,934,596 | 6/1990 | Hilton et al. | 239/8 |
| 5,104,696 | 4/1992 | Waisnix | 427/345 |
| 5,512,325 | 4/1996 | Langenohl et al. | 427/421 |

*Primary Examiner*—Shrive Beck
*Assistant Examiner*—Michael Barr
*Attorney, Agent, or Firm*—Mark Kusner

[57] ABSTRACT

A method of applying a high alumina, low cement refractory castable to the surface of a refractory structure, comprising the steps of:

a) preparing an intimately mixed castable for application onto the surface of a refractory structure, the refractory castable including by weight the following components:
80% to 86% alumina aggregate,
about 6% to 11% thermally reactive calcined alumina,
about 4% to 8% calcium aluminate cement;

b) conveying the refractory castable under pressure through a delivery hose to a dispensing nozzle for applying the refractory castable; and c) adding calcium chloride to the refractory castable prior to application by the nozzle at a rate wherein the calcium chloride comprises about 0.05% to 0.15% by weight of the refractory castable applied by the dispensing nozzle.

5 Claims, No Drawings

6,054,186

LOW CEMENT REFRACTORY CASTABLE SYSTEM FOR WET PROCESS PUMPING/SPRAYING

FIELD OF THE INVENTION

The present invention relates generally to shotcreting installations and processes, and more particularly, to a low cement, low moisture refractory castable wet process shotcreting system.

BACKGROUND OF THE INVENTION

In recent years, refractory shotcreting has become a major process for the repair and maintenance of refractory linings in steel, non-ferrous metal, chemical, mineral and ceramic processing plants.

Shotcreting is usually classified according to the process used, i.e., wet-mix or dry-mix spraying. A wet-mix refractory shotcrete process generally consists of thoroughly mixing a refractory material and water to produce a pumpable mixture, then introducing the mixture into a delivery hose and pumping the mixture to a dispensing (i.e., spraying) nozzle. A dry-mix refractory shotcrete process generally consists of conveying a dry refractory mixture through the delivery hose by compressed air, then introducing water under pressure at the nozzle prior to application of the refractory to the target surface. In both processes, a set modifying admixture may typically be added to the refractory castable at the nozzle to initiate and accelerate the thickening and setting of the refractory castable so that it will not slump or sag when applied to vertical or overhead surfaces. Since the mixture must be fluid for pumping in the wet-mix process, such admixtures are more critical in the wet-mix compared to the dry-mix process.

Refractory shotcreting has found limited application in high temperature and severe corrosive applications, such as for example, in the steel making industry where the refractory material may be exposed to temperatures in the range of 2700° F. to 2900° F. and come in contact with corrosive slag materials. A main reason that shotcreting of refractories is limited in such applications is due to the materials added to the refractory compositions in order to facilitate their application by a wet-mix or a dry-mix shotcreting process. In both processes, a refractory castable mix is used as the base refractory composition. Most dry-process gun mixes are based on castable mixes that are modified to have finer (i.e., smaller) aggregate (than the castables) to reduce "rebound" when the refractory is applied to a surface. In addition, additives, usually clay, are added to the refractory to enhance the sticking (i.e., non-slumping) characteristic of the material when applied to vertical walls.

These modifications make dry gunning mixes less applicable to severe high temperature, corrosive applications as compared to castables of similar base composition because the clay adds considerable silica to the refractory. The addition of the silica to very pure alumina systems may have a detrimental effect particularly on the hot modulus of rupture (MOR) of the material and in high temperature shrinkage. In this respect, such gunning mixes may have lower strength at steel making temperatures in the range of 2700° F. to 2900° F. and exhibit a permanent linear change (i.e., shrinkage) at certain temperatures, i.e., above 2700° F. In addition, such gun mixes typically have high porosity which is related to the clay addition, altered grain sizing and incomplete mixing inherent in a dry gunning process. As a result, such gun mixes are less than desirable in repairing steel ladle linings or other surfaces where such linings would be exposed to extremely high temperatures, i.e., above 2700° F.

A wet-mix shotcreting process overcomes the less than desirable mixing inherent in a dry-guinning process and does not generally require the addition of clay to the base refractory castable composition used. To facilitate the wet-mix process, however, a set modifying admixture, conventionally referred to as an "accelerator" must be added to the wet-mix refractory just prior to spraying to accelerate the thickening and setting of the refractory castable in order to prevent slumping and sagging of the refractory when it is applied to a vertical surface. Many accelerators, however, are known to have a negative effect on the properties of most high alumina, low cement refractories that are typically used for high temperature, high corrosive environments. Sodium silicate, for example, is a well known accelerator used in wet-mix and dry-mix refractory shotcreting. However, even small additions of alkalis, such as sodium, can reduce high temperature strength and refractoriness in high alumina, low cement refractories. It is, therefore, desirable to provide a wet-mix shotcreting process capable of use in high temperature applications not having these drawbacks.

The present invention provides a wet-mix shotcreting process for applying high alumina, low cement refractory material for high temperature applications.

SUMMARY OF THE INVENTION

In accordance with the present invention, there is provided a method of applying a high alumina, low cement refractory castable to the surface of a refractory stricture, comprising the steps of:

a) preparing an intimately mixed refractory castable including by weight the following components:
about 80% to 86% alumina aggregate,
about 6% to 11% thermally reactive calcined alumina,
about 4% to 8% calcium aluminate cement;

b) conveying the refractory castable under pressure through a delivery hose to a dispensing nozzle for applying said refractory castable; and, c) adding calcium chloride to the refractory castable prior to application by the nozzle at a rate wherein the calcium chloride comprises about 0.05% to 0.15% by weight of the refractory castable applied by the dispensing nozzle.

In accordance with another aspect of tile present invention, there is provided a method of applying a refractory castable to the surface of a structure, comprising the steps of:

thoroughly mixing a refractory material comprised primarily of alumina aggregate, thermally reactive calcined alumina and calcium aluminate cement, wherein the refractory has an aluminum oxide ($Al_2O_3$) content by weight of greater than 95%;

conveying the refractory material under pressure through a delivery hose to a dispensing nozzle for applying the refractory material; and adding calcium chloride to the refractory material prior to application by the nozzle at a rate wherein the calcium chloride comprises less than about 0.20% by weight of the refractory material applied by the dispensing nozzle, the refractory having a modulus of rupture greater than 1000 psi at temperatures above 2500° F.

In accordance with another aspect of the present invention, there is provided a high temperature refractory castable system for application in a wet-mix shotcreting process, comprised of:

a refractory component comprised by weight of:
  about 55% to 70% fused white alumina having a particle size less than about 3 mesh,
  about 6% to 12% thermally reactive calcined alumina having a particle size of about 0.5 to 3 microns,
  about 15% to 25% tabular alumina having a particle size of about 45 microns or less, and
  about 3% to 6% calcium aluminate cement, the refractory component to be hydrated and mixed to be dispensed under pressure through a dispensing nozzle; and
a set modifying admixture component to be added to the hydrated refractory component prior to mixing, the set modifying admixture comprised of calcium chloride, the calcium chloride comprised by weight less than about 0.20% of said refractory system.

It is an object of the present invention to provide a wet-mix process for applying a refractory castable material.

Another object of the present invention is to provide a process as described above for use with low cement, high alumina refractory material.

Another object of the present invention is to provide a process as described above for applying refractory material for use in high temperature applications.

A still further object of the present invention is to provide a process as described above wherein low cement, high alumina refractory castables may be shotcreted and wherein the physical properties of the shotcreted refractory closely approach the properties of a cast-vibrated refractory.

A still further object of the present invention is to provide an accelerator for a wet-mix shotcreting process for applying low cement, high alumina refractory castables wherein the accelerator has minimal impact on the physical properties of the pumped and sprayed mix, and the final cured refractory castable material.

These and other objects and advantages will become apparent from the following description of a preferred embodiment of the invention.

DETAILED DESCRIPTION OF PREFERRED EMBODIMENT

The present invention relates to a refractory system for high temperature applications, and a method of applying such system by a wet-mix shotcreting process. In the context of the present invention, two aspects of the refractory system are important. First, the refractory system, when hydrated and mixed, must have a consistency and flow characteristics capable of being applied by means of a wet-mix shotcreting process. Second, the refractory system, when cured and dried, must having physical properties capable of withstanding elevated temperatures, particularly in the range of 2500° F. to 3000° F. for use in high temperature applications, and a corrosive environment.

In accordance with the present invention, there is provided a low cement, low moisture, high alumina content refractory system having a consistency and flow properties when mixed with water, making it suitable for wet-mix shotcreting, which refractory system has physical properties, when applied, capable of withstanding elevated temperatures above 2500° F. Broadly stated, the present invention relates to a refractory composition and a set modifying admixture for use with such composition in a wet-mix shotcreting process.

According to the present invention, the refractory mix is preferably comprised of approximately 80% to 86% alumina aggregate, 6% to 11% thermally reactive calcined alumina and 4% to 8% of a calcium aluminate cement. The refractory mix may also include small amounts of a dispersant to aid mixing of the refractory material and a small amount of fiber additives to create fine channels within the refractory to allow steam to escape during initial heating of the castable. With respect to the alumina aggregate, such aggregate preferably has a particle size of 3-mesh or less wherein about 60% of the aggregate has a particle size of 14-mesh or less.

The alumina aggregate of the foregoing material may be comprised of fused white alumina or tabular alumina. According to a preferred embodiment, approximately 60% to 65% of the alumina aggregate is comprised of fused white alumina and between 18% and 25% is comprised of tabular alumina. A preferred composition of the refractory material has the following formula:

| REFRACTORY | | | |
|---|---|---|---|
| Raw Material | Tyler Mesh Size | "Average" Particle Size | % Weight |
| Fused white alumina | 3 × 6 | between 6.7 mm & 3.35 mm | 7.50 |
| Fused white alumina | 6 × 14 | between 3.35 mm & 1.18 mm | 17.50 |
| Fused white alumina | 14 × 28 | between 1.18 mm & 600 microns | 17.50 |
| Fused white alumina | −14 | less than 1.18 mm | 20.00 |
| Thermally reactive calcined alumina | — | 0.5–3 microns | 9.00 |
| Tabular (sintered) alumina | −325 | less than 45 microns | 20.00 |
| Calcium aluminate cement | | | 5.00 |
| Raw Dolomite (MgCaCO$_3$) | −200 | less than 75 microns | 4.00 |

The calcium aluminate cement of the foregoing refractory material is comprised of 71% aluminum oxide ($Al_2O_3$) and 28% calcium oxide (CaO).

The foregoing refractory material preferably includes a dispersant to facilitate mixing and to enhance the fluidity of the refractory material. Organic fibers are added to create micro-channels through the refractory to allow for steam to escape during the initial heating so as to prevent catastrophic failure during high temperature service.

The following additives may be used:

| ADDITIVES | | |
|---|---|---|
| Raw Material | Particle Size | % Weight |
| Sodium naphthalene sulfonate-formaldehyde (dispersant) | | 0.20 |
| Polypropylene fibers | 3.0 denier, 5–10 mm length | 0.08 |

The foregoing refractory castable, when mixed with water, exhibits good flow and spraying characteristics when used in a wet-mix shotcreting process. In this respect, the smaller aggregate particles produce better flow in and through the mixing chamber and through the dispensing hose and nozzle of the spraying apparatus. In addition, the smaller aggregate size reduces aggregate "rebound" from the surface to be lined.

In accordance with another aspect of the present invention, a set modifying admixture component is utilized in the wet-mix slhotcreting process to provide stickiness and non-slumping characteristics to the foregoing refractory. As indicated above, wet refractory mixes that contain considerable amounts of silica exhibit little strength at high temperature and exhibit a permanent linear shrinkage at such elevated temperatures. Thus, in accordance with the present invention, the silica content of the refractory material is maintained below 0.2% by weight of the shotcreted refractory by utilizing a non-silica containing set modifying admixture.

In accordance with the present invention, calcium chloride is used as the set modifying admixture. It has been found that calcium chloride exhibits a less detrimental effect on the physical properties of the refractory material than other admixtures such as sodium silicate. As a contribution to the refractory mix, the calcium added is limited to 0.2% (calculated as calcium oxide) of the entire mix. A more acceptable range of added calcium would be about 0.05% to 0.15%. The preferable range of the weight percent addition of the calcium to the refractory material is 0.05% to 0.10%.

At the foregoing levels, the contributed CaO added to the mix is very small as compared to the levels existing in the refractory from the cement and other raw materials. With respect to the strength of the solution added, an excessive admixture liquid addition will increase the total water in the refractory, thereby increasing the porosity and lowering its density. Therefore, according to the present invention, it is preferred that the total liquid addition not exceed 0.5%, although acceptable properties may be obtained if the total liquid addition does not exceed 1%. The actual concentration of the calcium chloride solution is not critical as long as the acceptable ranges of calcium addition and total liquid addition are maintained. Very weak solutions will require higher than acceptable liquid additions. Very strong solutions must be added at low dosages to keep calcium additions within limits. Solutions of 33% to 50% calcium chloride by weight have been found to work well.

When a refractory material as described above is applied using calcium chloride at the preferred levels, a refractory material suitable for high temperature use is obtained. In this respect, tests show that the foregoing material applied by a wet-mix shotcreting process produce a set refractory having the following properties: at 230° F., the dried material has a density of 2.89 g/cm$^3$, a porosity of 18% and modulus of rupture (MOR) of 1000 psi. Even at elevated temperatures, the modulus of rupture (MOR) meets requirements for high temperature application. In this respect, the modulus of rupture at 2500° F. is 1200 psi and the modulus of rupture at 2700° F. is 1600 psi. The foregoing refractory thus provides a refractory material suitable for use in a wet-mix shotcreting process that is capable of withstanding high temperature applications.

The foregoing properties of the refractory material compare favorably to cast high alumina content low cement refractories and exceed the properties of high alumina content gun mixes. A test is conducted to compare the properties of the aforementioned refractory system against known high alumina, low cement refractory castables and high alumina refractory gun mixes. Two refractory castables are tested. Castable 1 has the following formula:

| CASTABLE 1 | | | |
|---|---|---|---|
| Raw Material | Tyler Mesh Size | Particle Size | % Weight |
| Fused white alumina | 3 × 6 | between 6.7 mm & 3.35 mm | 31.25 |
| Fused white alumina | 6 × 14 | between 3.35 mm & 1.18 mm | 10.0 |
| Fused white alumina | 14 × 28 | between 1.18 mm & 600 microns | 12.5 |
| Fused white alumina | −14 | less than 1.18 mm | 16.25 |
| Thermally reactive calcined alumina | | 0.5–3 microns | 7.50 |
| Tabular alumina | −325 | less than 45 microns | 13.5 |
| Calcium aluminate cement | — | — | 5.00 |
| Raw Dolomite (MgCaCO$_3$) | −200 | less than 75 microns | 4.00 |
| TOTAL | | | 100.0 |
| Additives: | | | |
| Sodium naphthalene | | | 0.225 |
| Sulfonate formaldehyde, dispersant | | | 0.08 |

Castable 2 is the same composition as the refractory mix of castable 1 except that the raw dolomite is not included.

The composition of the refractory gun mixes used in the test are set forth as follows:

| Raw Material | Mesh Size | Gun Mix 1 % Weight | Gun Mix 2 % Weight |
|---|---|---|---|
| Tabular alumina | 3 × 6 | — | — |
| Tabular alumina | 6 × 14 | 30 | 22.5 |
| Tabular alumina | 14 × 28 | — | 12.5 |
| Tabular alumina | −14 | 45 | — |
| Tabular alumina | 28 × 48 | — | 7.5 |
| Calcined alumina | | — | 22.5 |
| Calcium aluminate cement, 71% alumina | | — | 8.0 |
| Calcium aluminate cement, 80% alumina | | 21.7 | — |
| Ball Clay | | 3.3 | 3.00 |
| Microsilica | | — | 4.5 |
| Amorphous alumina | | — | 2.0 |
| Dispersant/superplasticizer condensed sulfonate naphthalene salt | | — | 0.15 |
| TOTAL | | 100 | 100.15 |

Gun Mix 1 has a conventional cement level, while Gun Mix 2 is a low cement type.

The composition of the respective materials (i.e., castable 1, castable 2, gun mix 1 and gun mix 2) and the refractory according to the present invention have generally similar chemical compositions. The following table shows a percent weight chemical analysis of the respective refractories:

| Chemical Analysis, wt % | Castable 1 | Castable 2 | Gun Mix 1 | Gun Mix 2 | Refractory mix according to present invention |
|---|---|---|---|---|---|
| $SiO_2$ | 0.1 | 0.1 | 2 | 4.1 | 0.2 |
| $Al_2O_3$ | 98 | 96 | 93 | 93 | 96.4 |
| $Fe_2O_3$ | 0.1 | .01 | 0.2 | 0.1 | 0.1 |
| MgO | 0.1 | .08 | 0.1 | 0.1 | 0.9 |
| CaO | 1.4 | 2.5 | 4 | 2.2 | 2.3 |
| $Na_2O + K_2O$ | 0.1 | 0.2 | 0.1 | 0.1 | 0.1 |

As seen in the table, each material has an alumina content in excess of 90% by weight. It is also important to note the high silica content of the gun mixes.

Castables 1 and 2 are poured under conventional casting techniques and gun mixes 1 and 2 are applied using a dry gunning process in a conventional manner. The following tables show the properties of the respective refractories as compared and contrasted to the refractory disclosed in the present invention.

| 230° F. Dried Properties | Castable 1 | Castable 2 | Gun Mix 1 | Gun Mix 2 | Refractory mix according to present invention |
|---|---|---|---|---|---|
| Density, g/cm³ | 3.12 | 3.12 | 2.59 | 2.69 | 2.89 |
| Porosity, % | 14 | 13 | 28 | 25 | 18 |
| Modulus of Rupture, psi | 1900 | 2000 | 1550 | 1200 | 1000 |
| Hot MOR, psi | | | | | |
| @ 2500° F. | 2000 | 3500 | 100 | 300 | 1200 |
| @ 2700° F. | 1000 | 3000 | — | — | 1600 |
| Permanent Linear Change after Heating to 2900° F. | +0.2 | +0.4 | −3.1 | −1.5 | +0.3 |

The foregoing table shows that the density of a refractory according to the present invention is less than the poured castables, but is greater than the gun mixes. Similarly, the refractory according to the present invention is more porous than the poured castables, hut less porous than the gun mixes. With respect to the modulus of rupture at 230° F., the refractory according to the present invention shows the lowest modulus of rupture at 1000 psi. However, at the elevated temperature of 2500° F., the shot refractory according to the present invention shows a modulus of rupture of 1200 psi. While this property is lower than the poured castables, it far exceeds the properties of the gun mixes at that temperature. At 2700° F., the modulus of rupture of the refractory according to the present invention is 1600 psi. This property exceeds one of the castables and is far superior to the gun mixes which are unable to withstand such temperature. The permanent linear change experienced by the disclosed refractory is +0.3. Such change is for practical purposes equivalent to the castable refractories, butt is superior to the gun mixes which experience shrinkage at the elevated temperature.

The present invention thus provides a refractory material suitable for wet-mix shotcreting which is applicable for high temperature application.

The present invention has been described with respect to a preferred embodiment of the invention. Modifications and alterations to the composition and makeup of the refractory material will become apparent to those skilled in the art after reading the specification. For example, although calcium chloride is tile preferred admixture for low moisture, low cement castables because of its ready availability, cost and effectiveness, other soluble inorganic or organic salts of the alkaline earths, such as Ca, Mg, Ba, Sr, etc., and ammonium are expected to be effective in providing the necessary non-slumping characteristics without adding silica to the refractory. It is intended that all such modifications and alterations be included in so far as they come within the scope of the patent as claimed, or the equivalents thereof.

Having described the invention, the following is claimed:

1. A method of applying a high alumina, low cement refractory castable having a low silica content to the surface of a refractory structure, comprising the steps of:

a) preparing an intimately mixed castable for application onto the surface of a refractory stricture, said refractory castable comprised of the following components:

a first refractory component comprised of about 80% to 86% by weight alumina aggregate, a second refractory component comprised of about 6% to 11% by weight thermally reactive calcined alumina having an average particle size of about 0.5 to about 3 microns, and a third refractory component comprised of about 4% to 8% by weight calcium aluminate cement;

b) conveying said refractory castable under pressure through a delivery hose to a dispensing nozzle for applying said refractory castable;

c) adding calcium chloride to said refractory castable prior to application by said nozzle at a rate wherein said calcium chloride comprises about 0.05% to less than 0.10% by weight of the refractory castable applied by said dispensing nozzle, said refractory castable having an aluminum oxide content by weight of greater than 95% by weight and having a silica content less than about 0.2% by weight; and d) applying said refractory castable to said surface.

2. A method as defined in claim 1, wherein said alumina aggregate of said first refractory component is comprised of fused white alumina.

3. A method as defined in claim 2, wherein said alumina aggregate of said first refractory component is further comprised of tabular alumina.

4. A method as defined in claim 2, wherein said first refractory component is comprised by weight of:

about 7.50% fused white alumina, 3×6 mesh, about 17.50% fused white alumina, 6×14 mesh, about 17.50% fused white alumina, 14×28 mesh, about 20.00% fused white alumina, −14 mesh, and about 20% tabular alumina having a particle size of about 45 microns or less;

said second refractory component is comprised of about 9% thermally reactive calcined alumina having a particle size of 3 microns or less; and third refractory component is comprised of about 5% calcium aluminate cement.

5. A method of applying a refractory castable to the surface of a structure, comprising the steps of:

thoroughly mixing a refractory material comprised of alumina aggregate, thermally reactive calcined alumina having an average particle size of about 0.5 to about 3 microns and calcium aluminate cement, wherein said refractory has an aluminum oxide content by weight of greater than 95%;

conveying said refractory material under pressure through a delivery hose to a dispensing nozzle for applying said refractory material;

adding calcium chloride to said refractory material prior to application by said nozzle at a rate wherein said calcium chloride comprises less than 0.10% by weight of the refractory material applied by the dispensing nozzle, said refractory having a modulus of rupture greater than 1000 psi at temperatures above 2500° F. and a silica content less than about 0.2% by weight; and applying said refractory material to said surface.

* * * * *